Sheet 1-2 Sheets.
D. C. Littlefield.
Magazine Stove.
No. 1,335.
Reissued Mar. 3, 1863.
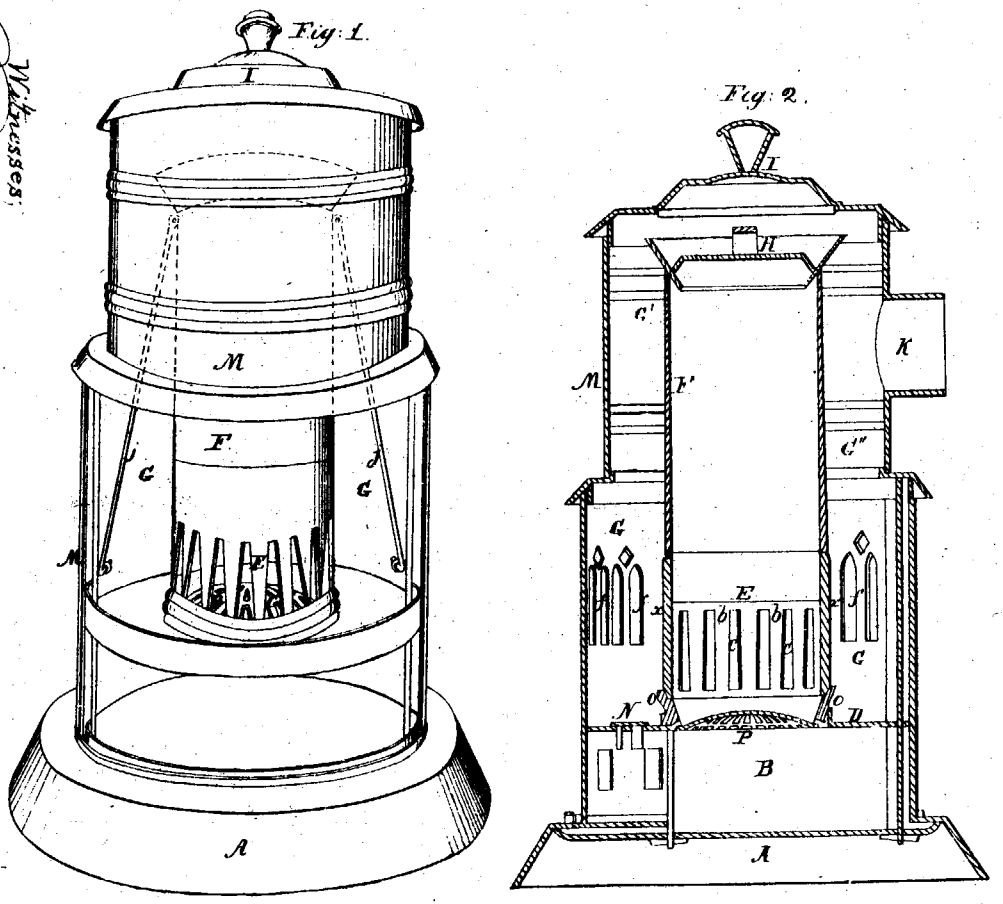
Witnesses;
Franklin Scott
Marcus P. Norton
Inventor,
Dennis C. Littlefield Sheet 2-2 Sheets.
D. C. Littlefield.
Magazine Stove.
No. 1335.
Reissued Mar. 3, 1863.
Fig. 9.
Vertical section.
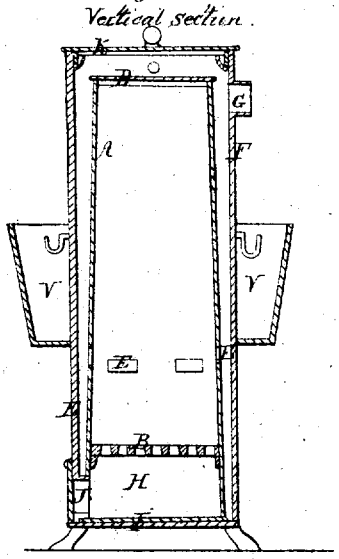
Fig. 3.
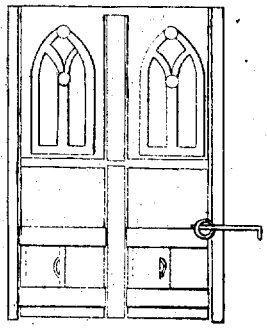
Fig. 10.
Horizontal section.
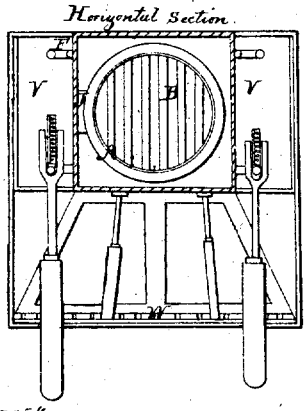
Fig. 11.
Front elevation of the Stove.
Figs. 9 & 10
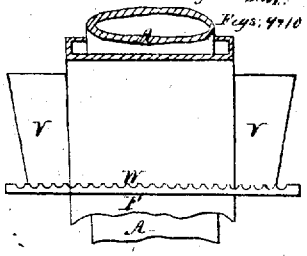
Witnesses.
Franklin Scott
Marcus P. Norton
Inventor;
Dennis C. Littlefield

UNITED STATES PATENT OFFICE.

DENNIS G. LITTLEFIELD, OF ALBANY, NEW YORK.

IMPROVEMENT IN STOVES.

Specification forming part of Letters Patent No. 10,448, dated January 24, 1854; Reissue No. 1,237, dated November 19, 1861; Reissue No. 1,335, dated August 26, 1862.

DIVISION NO. 4.

*To all whom it may concern:*

Be it known that I, DENNIS G. LITTLEFIELD, of the city and county of Albany, State of New York, did, on or about the 24th day of January, 1854, obtain of and from the United States of America certain Letters Patent for and upon a new method of constructing that class of stoves using a supplying-cylinder for the reserve coal, which said patent was duly reissued in two separate divisions or patents on the 19th day of November, 1861; and I do hereby declare that the following is a full and exact description of my invention, reference being hereby had to the accompanying drawings, and to the letters of reference marked thereon.

Like letters represent and refer to like or corresponding parts.

Figure 1 is a view of a cylinder-stove, a part of the outer cylinder being removed. Fig. 2 is a central vertical section of the same, and showing the arrangement of a fire-pot with vertical fire-grate around the lower part of the same and a coal-supply cylinder thereon and thereto attached, and each within an illuminated wall or cylinder, as herein described and set forth.

The nature of my invention consists in the arrangement of fire-pot, coal-supply, and gas-consuming chamber within an outer cylinder, which shall admit of the circulation of heat or the heated gases around and over the top of the same, thereby giving a large surface for reflection of heat into the room where the stove is used, and prevents any air from entering the coal-supply cylinder at the top, whereby the same is rendered safe and effectual.

To enable others skilled in the art to which my invention relates to make and use the same, I will here proceed to describe the construction and operation thereof, which are as follows, to wit:

I construct the fire-pot E, Figs. 1 and 2, with a vertical fire-grate all around the lower end of the same, where *b* represents the bar and *c* is the opening, which bars and openings form the vertical fire-grate. This fire-pot E thus constructed rests upon the ring or short cylinder *o*, Fig. 2. Upon the top of this fire-pot rests the coal supply chamber F, which extends upward to contain a large supply of coal and has a cover, H, fitted in the ordinary manner. This arrangement and combination of supply-cylinder and fire-pot is completely immersed within the chamber G and G′, in the lower part of which, at or near the vertical fire-grate, gas is consumed as it comes from the fire within the said fire-pot and coal supply chamber. The heated gaseous products of combustion pass up said chamber G and G′ and circulate around and wholly or partially over the top of the said coal-supply chamber on their passage to exit-pipe K, carrying with them any air that may enter any opening to G or G′, which chamber is formed by the outer wall, M, having cover I, which is fitted in the ordinary manner, and which chamber is of a larger diameter in the lower section than in the upper, making the chamber G of more capacity than chamber G′, giving a better appearance, and also a better draft to the stove, as it allows more room for the expansion of the highly-heated gases as they issue from the fire-pot E.

It will readily be seen that any air entering chamber G′ under the cover I will pass direct to exit-pipe K, so that no air can possibly enter said coal-supply chamber at the top to cause combustion of the coal or an explosion of the gases, which gases are intended to descend in said coal-supply chamber F and be consumed as they find egress through the fire and vertical fire-grate in said fire-pot E.

Having thus described by invention, what I claim, and desire to secure by Letters Patent, is—

The combination of the fire-pot E with the coal-supply cylinder F, immersed within the outer cylinder, M, which forms the chambers G and G′, substantially as and for the purpose herein described.

DENNIS G. LITTLEFIELD.

Witnesses:

JAMES B. SANDERS,

A. N. DE WITT.